(12) United States Patent
Immonen et al.

(10) Patent No.: US 8,837,401 B2
(45) Date of Patent: *Sep. 16, 2014

(54) INTERFERENCE CONTROL MECHANISM IN MULTI-BAND COMMUNICATION

(75) Inventors: Antti Oskari Immonen, Helsinki (FI); Jouni Kristian Kaukovuori, Vantaa (FI); Jari Isokangas, Tampere (FI); Jukka Ranta, Kaarina (FI)

(73) Assignee: Broadcom Corporation, Irvine, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/366,639

(22) Filed: Feb. 6, 2012

(65) Prior Publication Data

US 2013/0194938 A1  Aug. 1, 2013

(30) Foreign Application Priority Data

Jan. 30, 2012  (GB) ................................. 1201537.6

(51) Int. Cl.
*H04W 4/00* (2009.01)
*H04W 72/08* (2009.01)

(52) U.S. Cl.
CPC ................................. *H04W 72/082* (2013.01)
USPC .......................................... 370/329; 455/63.1

(58) Field of Classification Search
CPC .......... H04W 72/1215; H04W 72/082; H04W 88/06
USPC ......... 370/252, 328, 332, 230, 338, 339, 437, 370/465, 517, 528, 529; 455/1, 63.1, 114.2, 455/296, 278.1
See application file for complete search history.

(56) References Cited

U.S. PATENT DOCUMENTS

| | | | | |
|---|---|---|---|---|
| 6,580,745 | B1 * | 6/2003 | Kondo | 375/130 |
| 2003/0054839 | A1 * | 3/2003 | Ono | 455/456 |
| 2003/0147368 | A1 * | 8/2003 | Eitan et al. | 370/338 |
| 2005/0075122 | A1 * | 4/2005 | Lindoff et al. | 455/522 |

(Continued)

FOREIGN PATENT DOCUMENTS

| | | |
|---|---|---|
| EP | 1 976 157 A2 | 10/2008 |
| WO | WO 03/067827 A1 | 8/2003 |

(Continued)

OTHER PUBLICATIONS

3GPP TR 36.816 V11.2.0 (Dec. 2011), "3$^{rd}$ Generation Partnership Project; Technical Specification Group Radio Access Network; Evolved Universal Terrestrial Radio Access (E-UTRA): Study on Signalling and Procedure for Interference Avoidance for in-device Coexistence (Release 11)", 44 pgs.

*Primary Examiner* — Paul H Masur
*Assistant Examiner* — Michael Phillips
(74) *Attorney, Agent, or Firm* — Stanton IP Law

(57) ABSTRACT

There is provided a mechanism for controlling communications conducted in multiple frequency bands so as to decrease an interference level between the communications. When an interference situation caused between a first set UL communications performed on at least two different frequency bands and a DL communication performed on another frequency band is determined, a frequency carrier deactivation processing is conducted so as to deactivate either one of carriers of the at least two frequency bands of the set of UL communications. The deactivation processing includes for example an autonomous denial on the UE side or an interference reporting with deactivation on the eNB side.

20 Claims, 14 Drawing Sheets

(56) References Cited

U.S. PATENT DOCUMENTS

| | | | |
|---|---|---|---|
| 2007/0080781 A1* | 4/2007 | Ginzburg et al. | 340/7.21 |
| 2008/0008152 A1* | 1/2008 | Lohr et al. | 370/342 |
| 2009/0137237 A1* | 5/2009 | Nakashima et al. | 455/422.1 |
| 2009/0325566 A1* | 12/2009 | Bell et al. | 455/419 |
| 2010/0304770 A1* | 12/2010 | Wietfeldt et al. | 455/509 |
| 2011/0103326 A1* | 5/2011 | Kim et al. | 370/329 |
| 2011/0167312 A1* | 7/2011 | Ogawa et al. | 714/749 |
| 2011/0312288 A1* | 12/2011 | Fu et al. | 455/88 |
| 2012/0020231 A1* | 1/2012 | Chen et al. | 370/252 |
| 2012/0040620 A1* | 2/2012 | Fu et al. | 455/63.1 |
| 2012/0040715 A1* | 2/2012 | Fu et al. | 455/553.1 |
| 2012/0069766 A1* | 3/2012 | Fu et al. | 370/252 |
| 2012/0093009 A1* | 4/2012 | Wang et al. | 370/252 |
| 2012/0236736 A1* | 9/2012 | Frank et al. | 370/252 |
| 2012/0275362 A1* | 11/2012 | Park et al. | 370/311 |
| 2012/0282875 A1* | 11/2012 | Park et al. | 455/404.1 |
| 2013/0070609 A1* | 3/2013 | Hultell et al. | 370/241 |
| 2013/0083672 A1* | 4/2013 | Johansson et al. | 370/252 |
| 2013/0114583 A1* | 5/2013 | Park et al. | 370/338 |
| 2013/0303215 A1* | 11/2013 | Piipponen et al. | 455/501 |

FOREIGN PATENT DOCUMENTS

| | | |
|---|---|---|
| WO | WO 2011/157235 A1 | 12/2011 |
| WO | WO 2011/162676 A1 | 12/2011 |
| WO | WO 2012/051952 A1 | 4/2012 |

* cited by examiner

INTERFERENCE CONTROL MECHANISM IN MULTI-BAND COMMUNICATION

BACKGROUND OF THE INVENTION

1. Field of the Invention

The present invention relates to a mechanism for controlling communications conducted in multiple frequency bands so as to decrease an interference level between the communications. In particular, the present invention is directed to apparatuses, methods and computer program products providing interference control mechanisms by means of which communications conducted for example in an in-device co-existence scenario suffer less interferences from each other, in particular when using carrier aggregation.

2. Related Background Art

Prior art which is related to this technical field can e.g. be found in technical specifications according to 3GPP TR 36.816 (e.g. version 11.2.0).

The following meanings for the abbreviations used in this specification apply:
BS: base station
BT: Bluetooth
CA: carrier aggregation
CC: component carrier
CPU: central processing unit
CSI: channel state information
DL: downlink
DRX: discontinuous reception
eNB: evolved node B
GNSS: global navigation satellite system
GPS: global positioning system
H3: $3^{rd}$ order harmonic distortion
IDC: in-device co-existence
IMD: intermodulation distortion
ISM: industrial, scientific, medical
LTE: Long Term Evolution
LTE-A: LTE Advanced
PSD: power spectral density
PUCCH: physical uplink control channel
PUSCH: physical uplink shared channel
RAT: radio access technology
RB: resource block
RF: radio frequency
SRS: sounding reference signal
SW: software
TX: transmission, transmitter
UE: user equipment
UL: uplink
WLAN: wireless local access network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between communication elements such as a UE and another communication element or UE, a database, a server, etc., one or more intermediate network elements such as communication network control elements, support nodes or service nodes are involved which may belong to different communication networks.

In order to allow users to access various networks and services ubiquitously, an increasing number of UEs are equipped with multiple radio transceivers. For example, a UE may be equipped with LTE, WiFi, and Bluetooth transceivers, as well as GNSS receivers.

However, such a configuration may result in more complicated interference situations due to coexistence interference between those collocated radio transceivers. For example, due to extreme proximity of multiple radio transceivers within the same UE, the transmit power of one transmitter may be much higher than the received power level of another receiver.

Conventionally, it is tried by using filter technologies and sufficient frequency separation to avoid significant interference resulting from a transmit signal. However, for some coexistence scenarios, e.g. different radio technologies within the same UE operating on adjacent frequencies, current state-of-the-art filter technology might not provide sufficient rejection. Therefore, solving the interference problem by single generic RF design may not always be possible so that alternative methods have to be considered.

SUMMARY OF THE INVENTION

Examples of embodiments of the invention provide an apparatus, method and computer program product by means of which communications conducted in multiple different frequency bands can be controlled so as to decrease an interference level between the communications. In particular, examples of embodiments of the invention provide apparatuses, methods and computer program products providing interference control mechanisms by means of which communications conducted for example in an in-device co-existence scenario suffer less interferences from each other, in particular when using carrier aggregation.

This is achieved by the measures defined in the attached claims.

According to an example of an embodiment of the proposed solution, there is provided, for example, an apparatus comprising at least one processor, and at least one memory including computer program code, the at least one memory and the computer program code configured to, with the at least one processor, cause the apparatus at least to perform an interference determination function configured to determine an interference situation caused between a first set of communications performed on at least two different frequency bands and a second communication performed on another frequency band being different to the at least two frequency bands of the first set of communications, and a frequency carrier deactivation processing function configured to conduct a deactivation procedure to deactivate either one of carriers of the at least two frequency bands of the first set of communications in case the interference situation is determined.

Furthermore, according to an example of an embodiment of the proposed solution, there is provided, for example, a method comprising determining an interference situation caused between a first set of communications performed on at least two different frequency bands and a second communication performed on another frequency band being different to the at least two frequency bands of the first set of communications, and conducting a deactivation procedure to deactivate either one of carriers of the at least two frequency bands of the first set of communications in case the interference situation is determined.

Moreover, according to an example of an embodiment of the proposed solution, there is provided, for example, an apparatus comprising at least one processor, and at least one memory including computer program code, the at least one memory and the computer program code configured to, with the at least one processor, cause the apparatus at least to perform an interference situation report processing function configured to receive and process an interference report indicating an interference situation caused between a first set of communications performed on at least two different frequency bands and another communication performed on another frequency band being different to the at least two frequency bands of the first set of communications, wherein the interference report comprises frequency information identifying carriers of the at least two different frequency bands of the first set of communications, and a carrier transmission deactivation function configured to deactivate transmission on either one of carriers of the at least two frequency bands of the first set of communications on the basis of the frequency information comprised in the interference report.

In addition, according to an example of an embodiment of the proposed solution, there is provided, for example, a method comprising receiving and processing an interference report indicating an interference situation caused between a first set of communications performed on at least two different frequency bands and another communication performed on another frequency band being different to the at least two frequency bands of the first set of communications, wherein the interference report comprises frequency information identifying carriers of the at least two different frequency bands of the first set of communications, and deactivating transmission on either one of carriers of the at least two frequency bands of the first set of communications on the basis of the frequency information comprised in the interference report.

By virtue of the proposed solutions, it is possible to provide an apparatus, method and computer program product by means of which communications conducted in multiple different frequency bands (for example in an IDC application where two or more communications or radio transmissions in UL direction may cause interference on some DL communication(s) via plural frequency bands used for a respective communication (for instance, LTE B7/B40 band and ISM band co-existence), wherein also carrier aggregation (CA) is possible) can be controlled in such a manner that interference on victim communications, for example the DL communication having a weaker power level, is avoided. Thus, it is possible to achieve a consistent throughput in the communication, for example for communications via the ISM band or other (non-3GPP) RAT, while a TX datarate in the first communication (e.g. LTE-A in CA mode) is kept at a sufficient level. Furthermore, examples of embodiments of the invention can be implemented in existing network configurations, for example by means of a software or firmware update.

The above and still further objects, features and advantages of the invention will become more apparent upon referring to the description and the accompanying drawings.

DESCRIPTION OF PREFERRED EMBODIMENTS

Figure 1:
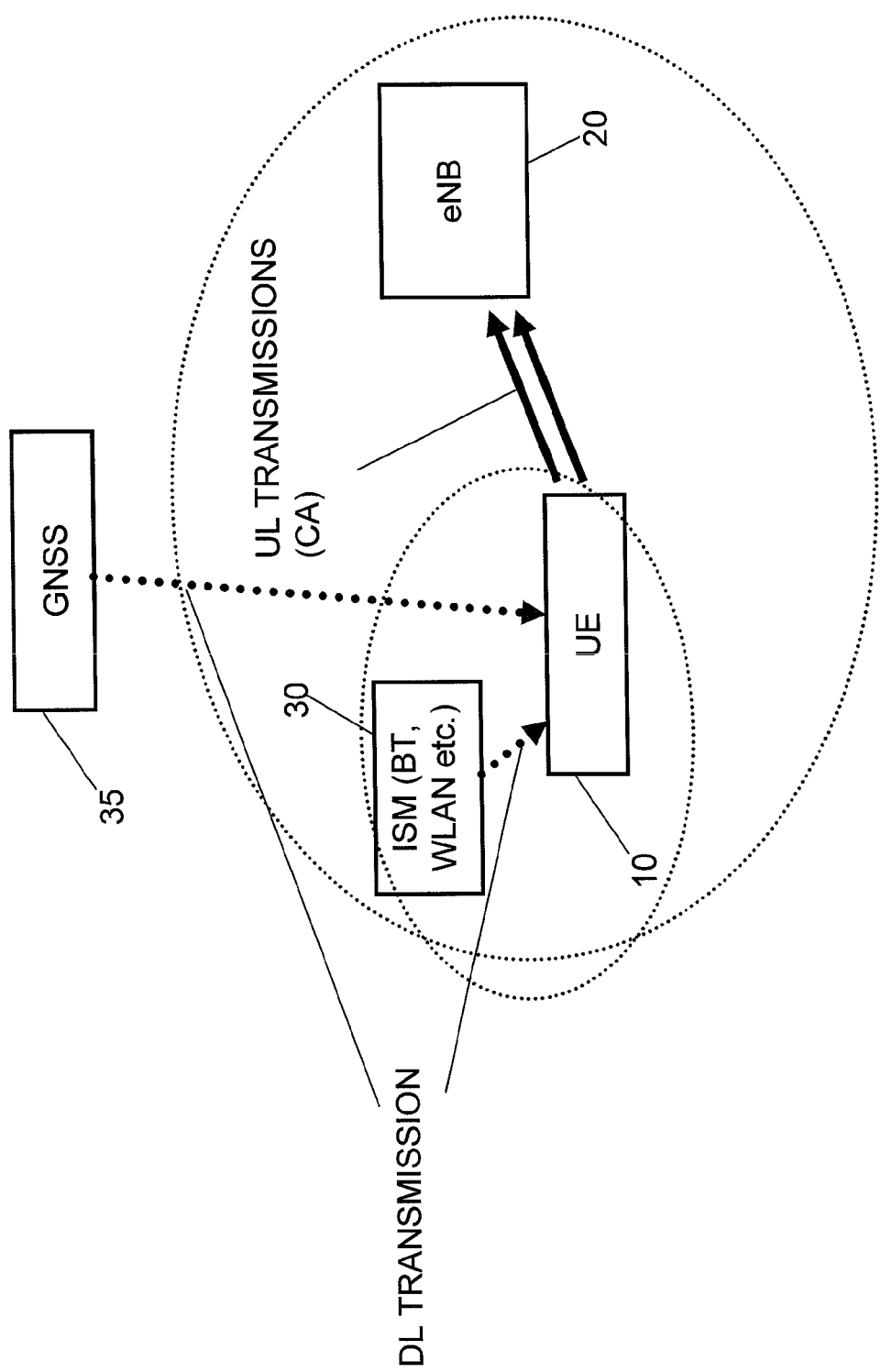
FIG. 1 shows a diagram illustrating a communication network structure in which examples of embodiments of the invention are applicable.

In the following, examples and embodiments of the present invention are described with reference to the drawings. For illustrating the present invention, the examples and embodiments will be described in connection with a cellular communication network based on a 3GPP LTE or LTE-A system wherein at least one further communication network is provided with which a UE can conduct a communication, such as an ISM network or a GSNN system. However, it is to be noted that the present invention is not limited to an application using such types of communication systems, but is also applicable in other types of communication systems and the like as long as interferences between communications may occur.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station (BS) or eNB, which control a coverage area also referred to as a cell and with which a communication element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB or a server etc., besides those described in detail herein below.

Furthermore, the described network elements, such as communication elements like UEs, communication network control elements like BSs, eNBs, servers and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network is shown where examples of embodiments of the invention are applicable. It is to be noted that the structure indicated in FIG. 1 shows only those devices, network elements and parts which are useful for understanding principles underlying the examples of embodiments of the invention. As also known by those skilled in the art there may be several other network elements or devices involved in a connection between the communication element (UE) and the respective networks which are omitted here for the sake of simplicity.

In FIG. 1, reference sign 10 denotes a communication element such as a UE or the like which is capable of communicating with different kinds of communication networks or devices, for example via carriers belonging to different frequency bands.

Reference sign 20 denotes a communication network control element such as a base station or eNB controlling a communication area or cell (indicated by a dashed line). It is to be noted that there may be several cells in the communication network which are controlled, for example, by the eNB 20 or by their own (not shown) communication network control element, which belong together with the cell of eNB 20 to an overlaying communication area.

In addition, communication networks or systems are present with which the UE 10 can communicate in parallel to the communications conducted with the eNB 20. For example, a communication system 30 using an ISM band, such as a BT or WLAN/WiFi system is provided, e.g. in the form of a corresponding server and transceiver. Another example for an alternative communication system is a GNSS (or other positioning) system 35 having plural transmitters e.g. in satellites which send signals for conducting a positioning operation.

As indicated above, in order to allow the UE 10 to ubiquitously access the various networks or communication systems and services as indicated in FIG. 1, the UE 10 is equipped with multiple radio transceivers. For example, in the configuration example as shown in FIG. 1, it is assumed that the UE 10 has a configuration as depicted, for example, in FIG. 2.

Figure 2:
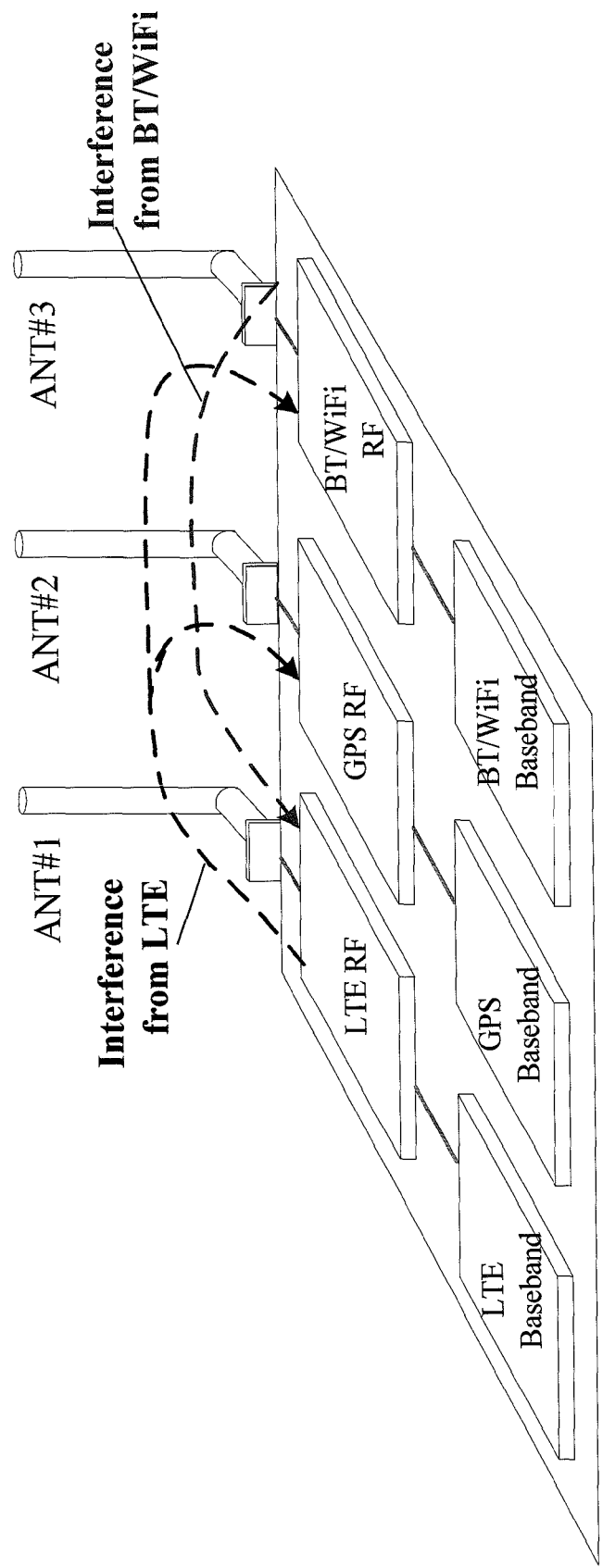
FIG. 2 shows a block circuit diagram illustrating a configuration of a communication element where interference caused by different communications is illustrated.

As indicated in FIG. 2, the UE 10 is equipped with plural transceiver/antenna configurations, for example a transceiver/antenna configuration connected to ANT#1 used for communications with the eNB 20 (referred to as LTE-A based communications), a receiver/antenna configuration connected to ANT#2 used for communications with the GNSS or GPS system 35 (referred to as GPS based communications), and a transceiver/antenna configuration connected to ANT#3 used for communications with the ISM based server 30 (referred to as WLAN/BT based communication).

In FIG. 2, examples for coexistence interference which may be generated between those collocated radio transceivers are indicated by dashed arrows. That is, due to the proximity of the multiple radio transceivers within UE 10, as indicated in FIG. 2, a situation may arise in which the transmit power of one transmitter may be much higher than the received power level of another transceiver/receiver. Hence, interference from the LTE-A based communications to the GPS based communication and/or the WLAN/BT based communication may arise, while on the other hand also interference from the WLAN/BT communication to the LTE-A based communication may occur.

It has been found out that the situation may become worse when for the communications with the eNB i.e. the LTE-A based communication carrier aggregation mode is used where CCs of different frequency bands are used for communication. One CA mode is the inter-band CA where e.g. two or more UL connections using different and separated carriers on different frequency bands are used. This is depicted in FIG. 1 by the two arrows from UE 10 to eNB 20.

However, active UL communications produce intermodulation products at certain frequencies. With some band combinations, the intermodulation product may hit on top of some other 3GPP and/or non 3GPP band, like the ISM band. In addition, in certain inter-band CA cases, either of the UL communications may produce third order harmonic distortion (H3) which overlaps with other network's or RAT's DL communications (indicated in FIG. 1 by dashed arrows from the ISM server 30 or the GSNN system 35 to the UE 10).

Figure 3:
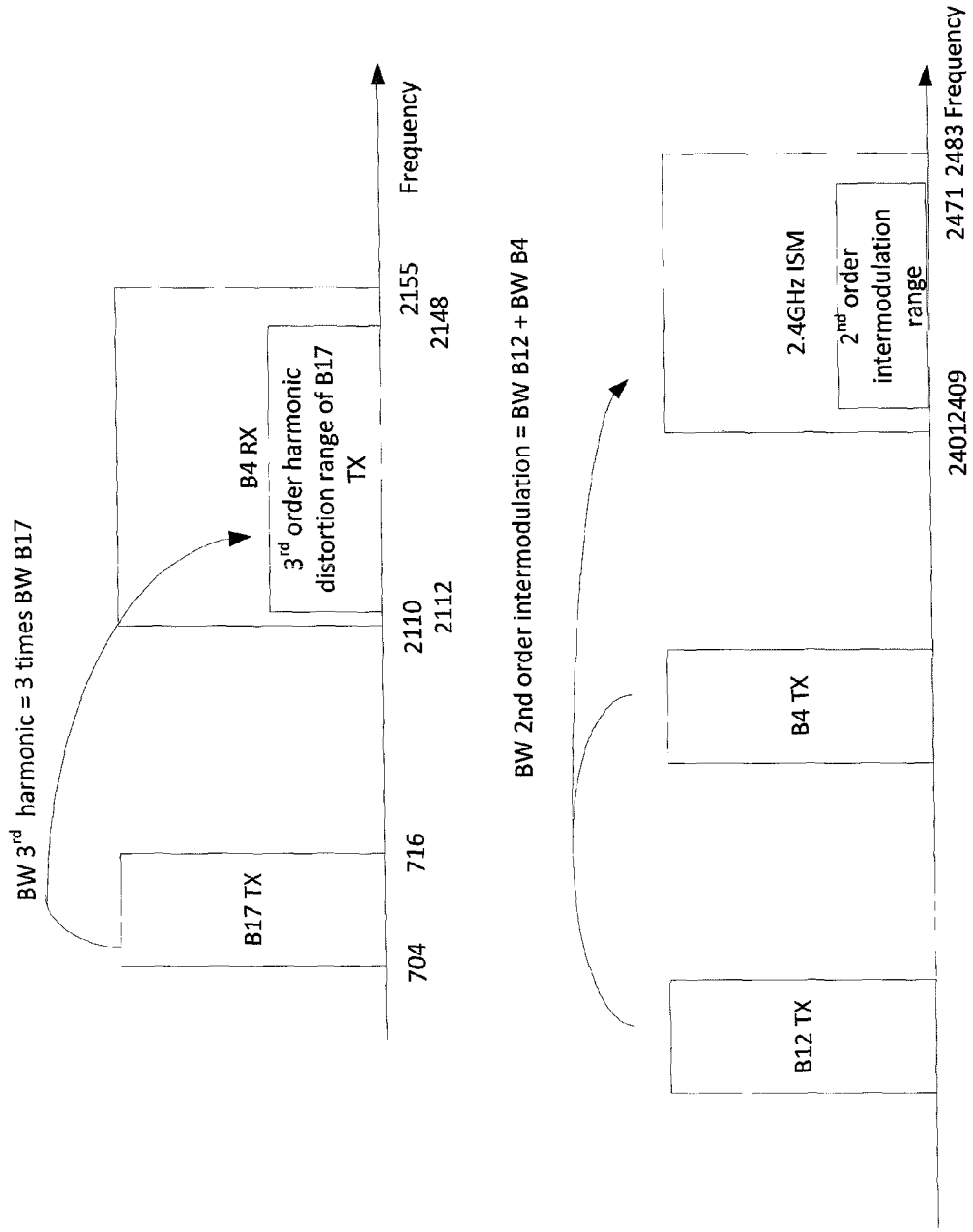
FIG. 3 shows a diagram illustrating examples of interferences caused by communications via different frequency bands.

FIG. 3 shows a diagram illustrating examples of interferences caused by communications via different frequency bands in a communication network configuration as indicated, for example, in FIG. 1. Specifically, FIG. 3 illustrates the behavior of H3 and $2^{nd}$ order intermodulation.

In the upper diagram of FIG. 3, the two frequency bands B17 (from e.g. 704 to 716 MHz) and B4 (from e.g. 2110 to 0.2155 MHz) are indicated wherein it is assumed that the B17 band is used for transmission (TX) and the B4 band is used for reception (RX). As indicated, a 3rd order harmonic distortion range of the B17 TX band is caused in the B4 band having a bandwidth being 3 times that of the B17 band.

In the lower diagram of FIG. 3, two frequency bands B12 and B4 are assumed to be used for transmission (TX). Furthermore, another frequency band such as an ISM band (here in 2.4 GHz range, from 2401 MHz to 2483 MHz) is assumed to be used for communication. It is to be noted that there exist several definitions or regulations regarding the frequency ranges of ISM bands which may be used instead of the range indicated here. For example, ITU defines ISM bands from 2.4 to 2.5 GHz, wherein BT operates from 2.4 to 2.484 GHz and WLAN operates in a similar frequency range. A 2nd order intermodulation range of a 2nd order intermodulation of bandwidths B12 and B4 is caused in the ISM band having a bandwidth from 2409 to 2471 MHz.

Figure 4:
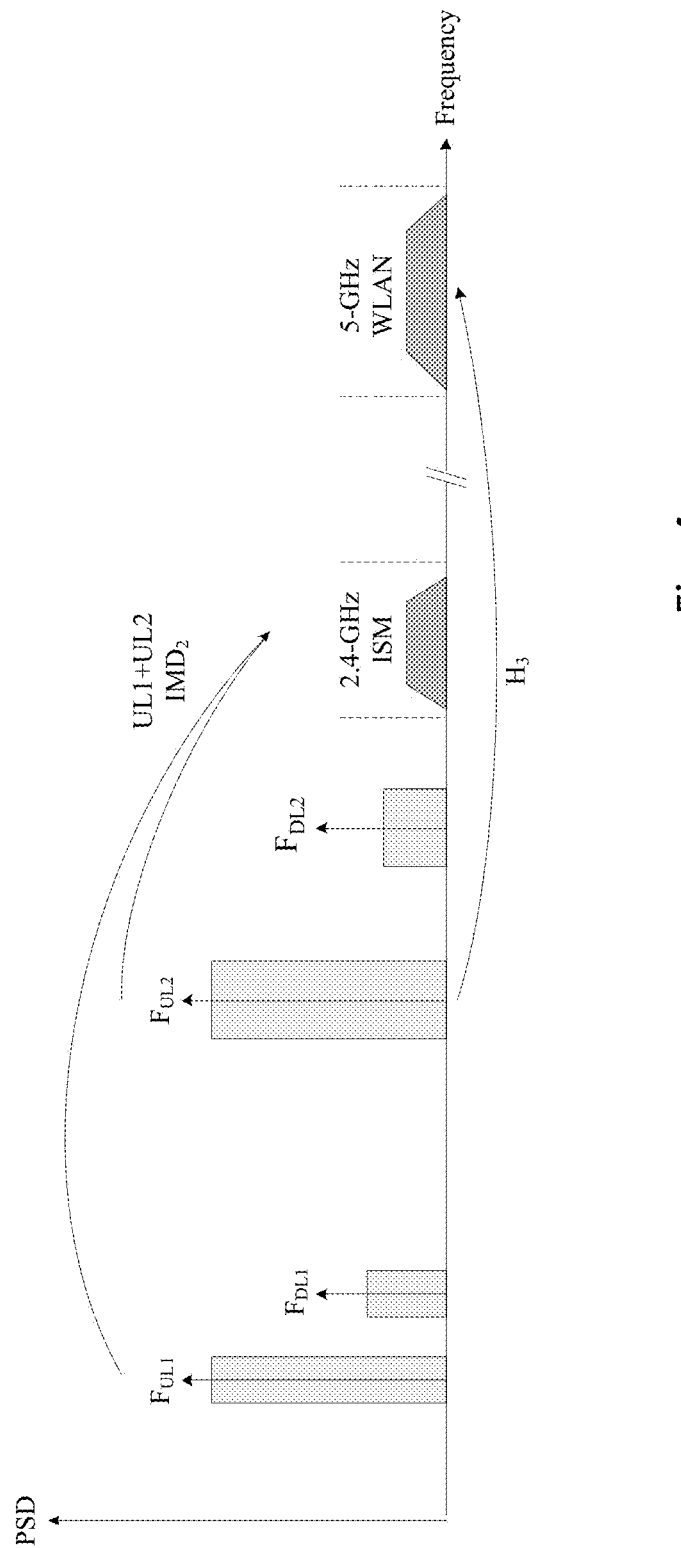
FIG. 4 shows a diagram illustrating examples of interferences caused by communications via different frequency bands.

FIG. 4 shows a further diagram illustrating examples of interferences caused by communications via different frequency bands in a communication network configuration as indicated, for example, in FIG. 1. In detail, FIG. 4 illustrates examples of 3GPP CA scenarios causing H3 and $2^{nd}$ order intermodulation interferences in non-3GPP bands (here, ISM-band of 2.4 and 5 GHz, or the like).

Specifically, different frequency bands providing frequency ranges used for UL communications, that is two UL communications UL1 and UL2 with frequencies $F_{UL1}$, $F_{UL2}$, and for DL communications, that is two DL communications DL1 and DL2 with frequencies $F_{DL1}$, $F_{DL2}$, are shown which are used e.g. for LTE-A based communications between the UE 10 and the eNB 20 as shown in FIG. 1, wherein the power of the UL communications is assumed to be higher than that of the DL communications (indicated by the height of the frequency range blocks). Furthermore, ISM and WLAN bands at 2.4 GHz and 5 GHz ranges are shown. As indicated by the arrows, a 2nd order intermodulation distortion (IMD2) is caused by the two UL communications at the 2.4 GHz ISM-band, and a 3rd order harmonic distortion H3 is caused by either of the UL communications (here UL communication UL2) at the 5 GHz band. That is, when referring back to the bands indicated in FIG. 3, for example, this would lead to a result where in case of B4+B12 band usage, the 2nd order intermodulation distortion (due to UL1+UL2) would cause desense on the 2.4-GHz ISM band and 3rd order harmonic of UL2 (B4) would hit the 5-GHz WLAN band.

In table 1, examples of CA band combinations are listed shown which represent aggressors causing interferences in other band(s), i.e. victim bands/frequency areas, in accordance with the general illustration of FIG. 4.

TABLE 1

Example of 3GPP CA scenarios causing IMD2 or H3 to non-cellular RATs

| Aggressors | | Victims | | |
|---|---|---|---|---|
| UL1 Band #1 | UL2 Band #2 | UL1 + UL2 IMD2 | UL1 H3 | UL2 H3 |
| 12 | 4 | 2.4 GHz ISM | — | 5-GHz WLAN |
| 17 | 4 | 2.4 GHz ISM | — | — |
| 20 | 12 | GPS (GNSS) | — | — |
| 5 | 12 | — | 2.4 GHz ISM | — |
| 5 | 4 | — | 2.4 GHz ISM | 5-GHz WLAN |
| 3 | 20 | — | 5-GHz WLAN | — |
| 3 | 5 | — | 5-GHz WLAN | 2.4 GHz ISM |
| 4 | 7 | — | 5-GHz WLAN | — |

That is, for example, respective component carriers allocated to the respective UL bands, e.g. a combination of component carriers of respective of UL bands B17 and B4 causes an IMD2 interference situation in the 2.4 GHz ISM-band, while a combination of UL bands B12 and B4 may cause an IMD2 interference situation in the 2.4 GHz band and the band B4 may cause a H3 interference situation in the 5 GHz band. It is to be noted that the effect of IMD2 depends on the actual frequency relation of the component carriers on the UL communications and victim DL communications. Furthermore, it is to be noted that the above list is not complete and that there are further combinations of UL frequency bands, CA band combinations and scenarios causing further interference situations.

According to examples of embodiments of the invention, mechanisms for controlling the communications conducted in a network configuration according to e.g. FIG. 1 with a UE having a multiple transceivers as shown e.g. in FIG. 2 are provided, by means of which interferences caused in an IDC case (3.g. 3GPP RAT+non-3GPP RAT) are decreased, in particular in case the UE operates in a CA mode, such as an inter-band CA mode, with two or more UL communications as indicated in FIGS. 1 and 4.

That is, according to examples of embodiments of the invention, in order to decrease the interferences caused by communications such as UL1 and UL2 communications on other communications such as those via the ISM band or WLAN band, as indicated in FIG. 4, either one of the at least two communications, i.e. carriers or the like on the respective frequency band causing the above described IDC interference through intermodulation (IMD2), is deactivated for at least a predetermined time or in intervals, or the like.

According to one set of examples of embodiments of the invention, the deactivation of at least one of the two communications (carriers) for at least a predetermined time or in intervals is executed of within the communication element, such as UE 10.

For example, according to an example of an embodiment of the invention, an autonomous denial operation is executed in the UE 10 for either one of the two UL communications. That is, according to examples of an embodiment of the invention, autonomous denial in an IDC case with inter-band CA and a non-3GPP RAT (like WLAN) is used, wherein the UE 10 is configured to use the autonomous denial on either of the LTE-A UL communications in case it is determined that they would cause an unacceptable desense to another RAT, such as a WLAN communication (as indicated in FIG. 4). In the autonomous denial according to examples of embodiments of the invention, the UE 10 conducts a deactivation processing in which either of the LTE-A UL communications is not transmitted during times when data is received via the other radio communication (WLAN).

According to further examples of the embodiment of the invention, triggers are provided that are used in order to maximize an UL throughput or to prioritize one of the UL communications etc, i.e. a selection process is executed in order to select that of the UL communications (carriers) for deactivation which causes a minimal impact on the communication performance in the LTE-A communication, for example.

A procedure for conducting the autonomous denial on the UE side according to examples of embodiments of the invention comprises the following processing.

First, it is determined whether an interference situation like that illustrated in connection with FIG. 4 is going to happen. For example, this determination may be based on a comparison between transmitting times and reception times via the different communication connections (LTE-A based connections, WLAN connection, etc.). In LTE and LTE-A, for example, the transmission and reception time is known some time in advance (e.g. ~4 ms or the like). Also reception timing for a non-3GPP communication like WLAN is known some time in advance. For example, in WLAN power save mode, only the beacons need to be received at certain time, all other data can be buffered in a hotspot and transmitted to the UE when it is possible. Thus, based for example on UL allocation grants received from the eNB 20 in configuration signaling, it can be determined that that transmissions via the UL connections to the eNB 20 (in inter-band CA mode, for example) would happen concurrently with a scheduled reception which leads e.g. to the IMD2 as shown in FIG. 4. In other words, the ISM DL connection is determined to be desensitized at the times of concurrent communications on these UL and DL communication paths.

It is to be noted that the determination of whether or not an interference situation is possibly present may also be based on other mechanisms. For example, a probability of a reception via the DL connection may be estimated and used as a basis for a determination of a concurrent communication. Alternatively, some priority level may be assigned to the non-3GPP communication (e.g. in case of high data transfer rates via a WLAN connection indicating that the user is currently interested in a proper reception) which may lead to the decision that the non-3GPP connection may not be interfered at any time.

After having determined that an interference situation is possible, the UE 10 conducts an autonomous denial process so as to deactivate either one of the at least two UL communications (i.e. carriers thereon). According to examples of embodiments of the invention, this deactivation may be done arbitrarily, or under a selection control.

In this selection control, it is determined which of the UL communications is preferably deactivated (for at least some time). The selection of the corresponding UL communication may be based, for example, on at least one of a determination that there is no control channel such as PUCCH included, a comparison which of the UL communications has less RBs allocated (if the communication with the less number of RBs is selected for the deactivation, inter-band throughput can be maximized), and/or an estimation which of the UL communications causes more interference, for example (in addition to the IMD2 interference) a H3 distortion (see e.g. table 1). On the basis of this processing, the UL communication (carrier) to be deactivated (temporarily) is determined. In other words, criteria for a selection of an UL communication to be deactivated may be based on a determination which CC does not have PUCCH, and/or which CC has less allocated RBs, and the like. Additionally or alternatively, according to further examples of embodiments of the invention, a selection can also be based for active antenna performance. That is, within the UE, it is possible that there are different antennas for Low and High bands. Then, there may be different antenna isolation between low/high band cellular and connectivity radio antennas due to different directivity, orientation etc.

It is to be noted that an interference level caused by the UL communications, such as the intermodulation distortion level, is actually low enough that the DL communication, such as that via the ISM band, is not desensitized in a critical manner. In other words, for example, even though the frequency relationship as indicated in FIGS. 3 and 4 is valid, a transmission power on the UL communications (i.e. LTE-A TX power level) is low enough so that the interference is not critical. Thus, according to examples of embodiments of the invention, it is determined whether the interference caused in the interference situation determined as described above is higher than a predetermined threshold or the like. If it is determined that the interference level is not critical (e.g. below the threshold) it is decided that there is no need to deny transmissions, and the deactivation of the carrier is stopped or not continued (for example, the determination of the interference level is conducted continuously or periodically when the deactivation is conducted so as to be able to react to changing communication properties like decreasing TX power level required for the UL communications).

According to exemplary embodiments of the present invention, the transmission mode control (i.e. conduct deactivation procedure or not) at the communication element (device/terminal) may comprise a hysteresis management functionality being configured to avoid excessive hysteresis between the transmission modes. In such hysteresis management, the communication element may base its decision for the applicability of a mode switching e.g. on network conditions, any available output power restriction value or values, battery capacity, whether there is a connection to power supply, which applications/services are active, movement of the device, CA band combination, TX resources, RX resources, or the like.

For example, according to examples of embodiments of the invention, a trigger for determining that it is not necessary to deactivate either one of the UL communications even if a (potential) interference situation is determined is based on a comparison of a preset threshold power level and the LTE-A TX output power value(s) on the UL communications. In case the threshold power level is not exceeded by the TX power value(s), then it is the deactivation is decided to be not necessary and the autonomous denial procedure is stopped, even if for example UL allocation grants indicate concurrent transmissions with ISM reception, or the like. On the other hand, in case the preset threshold is exceeded, then the autonomous denial for the selected UL communication (carrier) is executed. In other words, according to examples of embodiments of the invention, the UE 10 (or a processor portion thereof) checks Pcmax values (maximum transmission power per carrier values) against predefined TX power threshold values. It is to be noted that the preset power threshold value may be set according to configuration settings given by an operator, or may be adjusted or learned during operation of the system.

It is to be noted that the deactivation or denial of either one of the UL communications is done, for example, for a predetermined time, for instance on a per subframe basis (subframe duration in LTE or LTE-A is 1 ms, for example). That is, a decision regarding deactivation is done for each subframe. However, it is to be noted that also another time unit for the duration of a deactivation phase for an UL communication may be set.

Furthermore, it is to be noted that examples of embodiments of the invention may be implemented in a communication element such as a UE, a UE memory/application engine/processor or equivalent.

Figure 5:
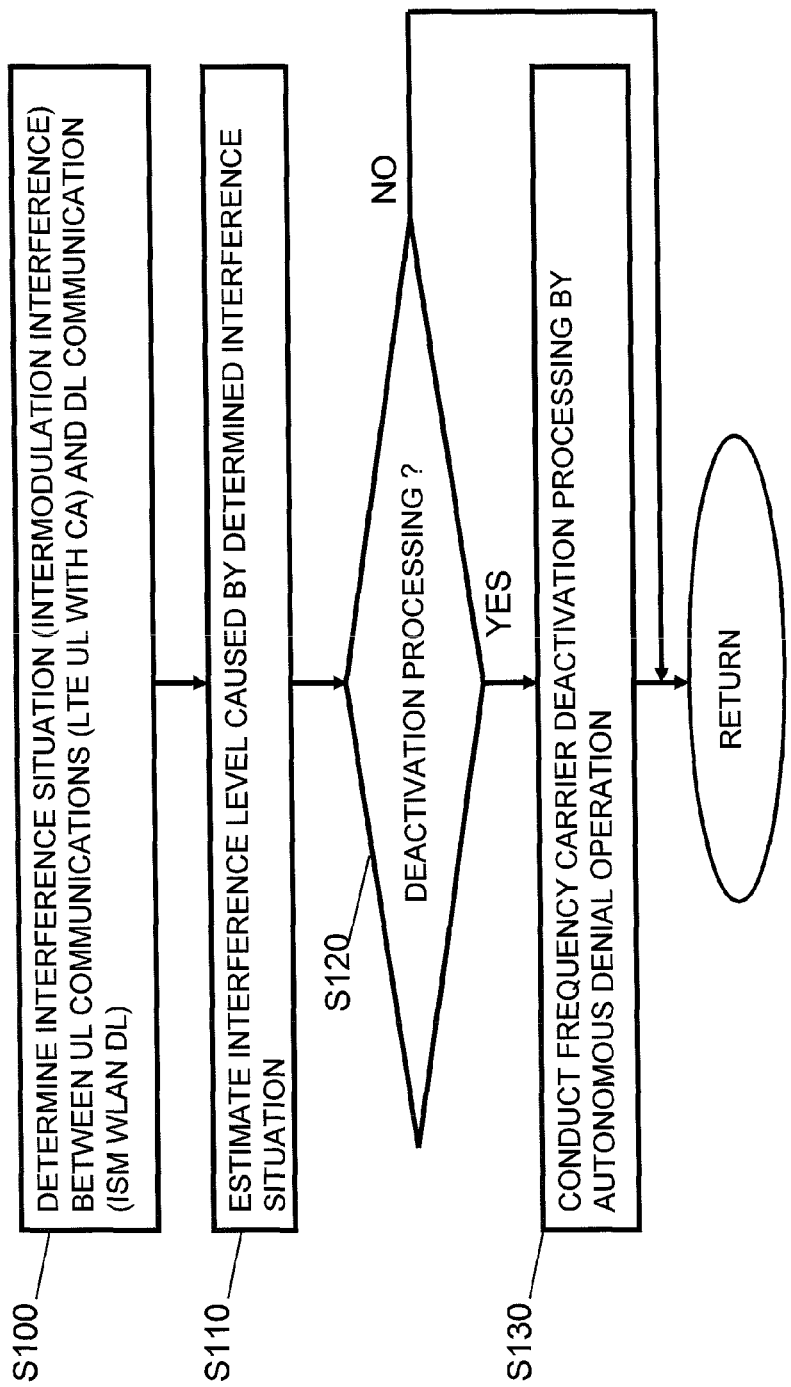
FIG. 5 shows flow chart illustrating a procedure conducted by a communication element according to an example of an embodiment of the invention.

FIG. 5 shows a flow chart illustrating a procedure conducted by a communication element, such as an UE 10 as shown in FIG. 1, according to an example of an embodiment of the invention.

In step S100, it is determined that an interference situation (e.g. IMD2 hitting at least partially of top of for instance used ISM channel) caused between a first set of communications performed on at least two different frequency bands (e.g. the UL1 and UL2 communications) and a second communication performed on another frequency band being different to the at least two frequency bands of the first set of communications (e.g. the DL communication on WLAN band). The interference situation is determined, for example, on the basis of a comparison between scheduled or estimated timings for transmissions in the first set of communications (e.g. the UL allocation grants) and scheduled or estimated timings for a transmission in the second communication (e.g. expected or known reception time in DL WLAN communication).

Then, in step S110, an interference level estimation is conducted so as to determine whether the determined interference situation is critical or not. That is, for example, a level of interference caused by the determined interference situation (IMD2 or the like) is compared with a predetermined threshold, for example on the basis of a comparison of TX power levels and a preset threshold, wherein on the basis of the comparison in step S120 a decision is made as to whether the deactivation procedure is conducted (e.g. in case the estimated level of interference is equal to or higher than the predetermined threshold; YES branch in FIG. 5), or the deactivation procedure is stopped (e.g. in case the estimated level of interference is lower than the predetermined threshold; NO branch in FIG. 5).

It is to be noted that steps S110 and S120 may also be omitted in examples of embodiments of the invention, i.e. the deactivation is executed as soon as an interference situation is determined (step S130 follows to step S100).

In step S130, a deactivation procedure is conducted so as to deactivate either one of carriers of the at least two frequency bands of the first set of communications, in case the interference situation is determined. According to present examples of embodiments of the invention, the deactivation procedure to deactivate either one of carriers of the at least two frequency bands of the first set of communications is an autonomous denial operation comprising a selection process for selecting either one of the carriers of the at least two frequency bands (based e.g. on the above described criteria), and a denial process for inhibiting a transmission on the selected carrier for a predetermined time based on the determined interference situation.

Figure 6:
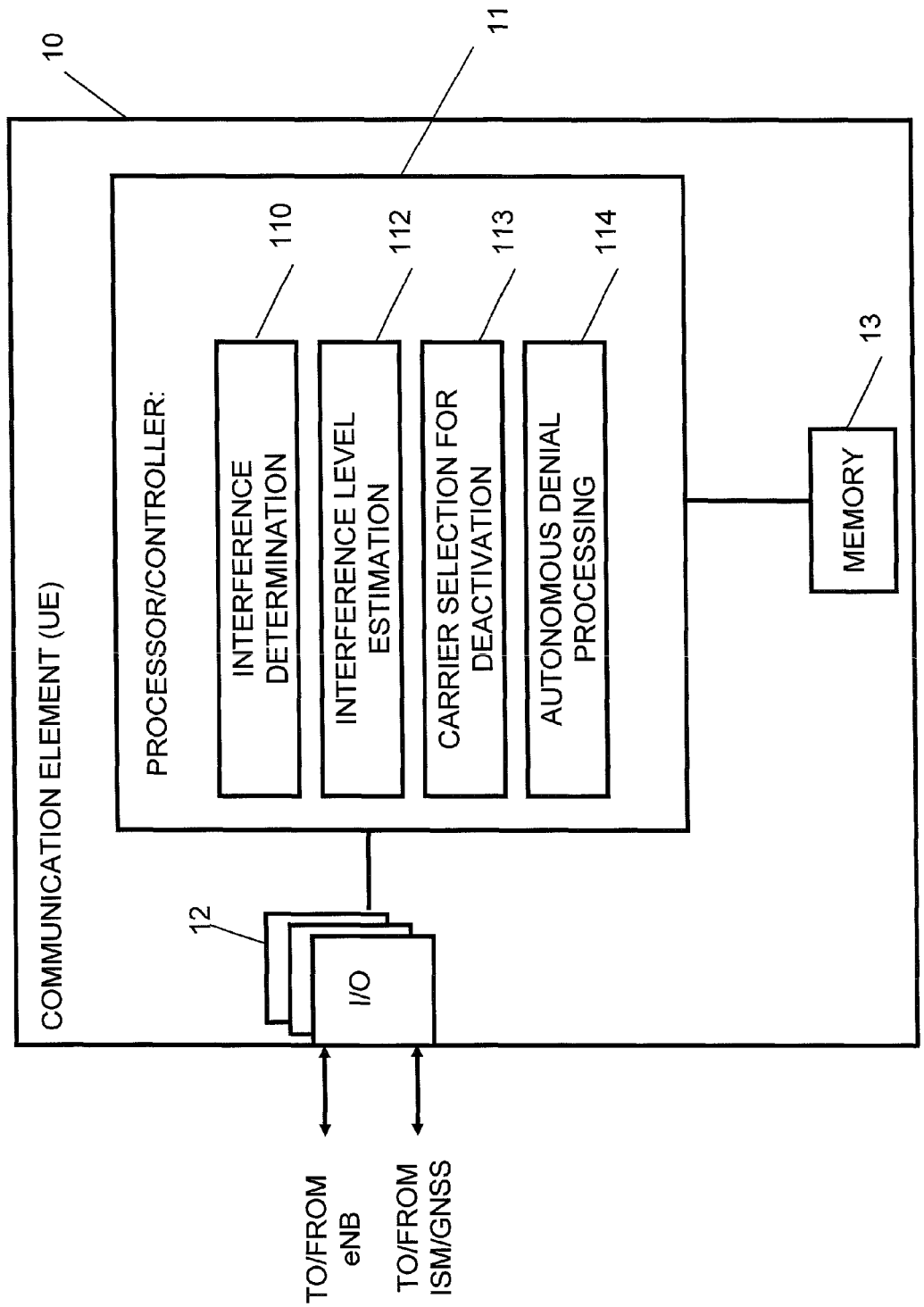
FIG. 6 shows a block circuit diagram of a communication element including processing portions conducting functions according to examples of embodiments of the invention.

In FIG. 6, a block circuit diagram illustrating a circuitry indicating a configuration of a communication element, such as UE 10, is shown, which is configured to implement the processing for controlling communications as described in connection with the examples of embodiments of the invention. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element or UE 10 shown in FIG. 6 may comprise several further elements or functions besides those described herein below, which are omitted herein for the sake of simplicity as they are not essential for understanding the invention. Furthermore, even though reference is made to an UE, the communication element may be also another device having a similar function, such as a modem chipset, a chip, a module etc., which can also be part of a device such as a UE or attached as a separate element to a UE, or the like.

The communication element or UE 10 may comprise a processing function or processor 11, such as a CPU or the like, which executes instructions given by programs or the like related to the control signal transmission control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O units 12 may be used for communicating with a communication network control element like eNB 20 and a communication network or system like ISM server 30 or GNSS system 35. The I/O unit 12 may be a combined unit comprising communication equipment towards several network elements, or may comprise a distributed structure with a plurality of different interfaces for different network elements (see e.g. FIG. 2). Reference sign 13 denotes a memory usable, for example, for storing data and programs to be executed by the processor 11 and/or as a working storage of the processor 11.

The processor 11 is configured to execute processing related to the above described mechanism for controlling communications. In particular, the processor 11 comprises a sub-portion 111 as a processing portion which is usable for determining an interference situation. The portion 111 may be configured to perform processing according to step S100 according to FIG. 5, for example. Furthermore, the processor 11 comprises a sub-portion 112 usable as a portion for estimating an interference level. The portion 112 may be configured to perform processing according to steps S110 and S120 according to FIG. 5, for example. In addition, the processor 11 comprises a sub-portion 113 as a processing portion which is usable for selecting a carrier (i.e. UL communication) for deactivation. Furthermore, the processor 11 comprises a sub-portion 114 as a processing portion which is usable for conducting the autonomous denial operation for the selected carrier. The portions 113 and 114 may be configured to perform processing according to step S130 according to FIG. 5, for example.

In the following, a further example of an embodiment of the invention is described.

In the preceding examples of embodiments of the invention, as the deactivation procedure, the UE 10 is arranged to conduct the autonomous denial. However, due to the autonomous denial, a communication network control element, such as the eNB 20, with which the deactivated communication is conducted (e.g. UL1, UL2) may be not sufficiently involved in this deactivation procedure.

Therefore, in order to ensure that the operation of the communication network control element is not distorted by the deactivation procedure, for example with regard to an estimation of the link adaptation parameters, or in cases where usage of an autonomous denial is restricted by the network operator, further examples of embodiments of the invention are discussed which provide an alternative communication control using another deactivation procedure.

According to the present examples of embodiments of the invention, the communication network control element with which the UE 10 conducts the communications of which either one is to be deactivated performs substantial parts of the deactivation procedure. That is, when the UE 10 determines that there is a (potential) interference situation, which may or may not be followed by a determination of whether the interference level is critical or not in the UE 10, then the deactivation procedure comprises a signaling from the UE 10 to the eNB 20 which indicates that there is an interference situation to be considered. In other words, according to the examples of embodiments of the invention, instead of conducting the autonomous denial, the UE 10 sends an interference report message to the eNB 20 in which the interference causing frequencies (e.g. pairs of frequencies of the UL1 and UL2 connections (carriers) are reported.

On the basis of this interference report, the eNB 20 conducts a deactivation processing for stopping a communication on one of the UL communications. In other words, the reported interference situation, such as the intermodulation interference, is solved by deactivating for example one of the carriers, wherein it is to be noted that either one of the carriers is deactivated.

According to further examples of the embodiment, the selection of the UL communication to be deactivated may be based on similar criteria as in the preceding examples according to FIG. 5, for example, i.e. by on at least one of a determination that there is no control channel such as PUCCH included, a comparison which of the UL communications has allocated less RBs allocated (if the communication with the less number of RBs is selected for the deactivation, inter-band throughput can be maximized), and/or an estimation which of the UL communications causes (in addition to the IMD2 interference) a H3 distortion (see e.g. table 1). Such determinations may be conducted by the eNB 20, or by the UE 10 wherein in the latter case a corresponding indication of a preferred deactivation target may be included in the interference report.

According to further examples of the embodiment, when the interference report is received and processed by the eNB 20 (resulting in a deactivation of an UL communication), the eNB 20 sends a corresponding indication to the UE 10 for informing about the deactivation.

For the deactivation of the UL communication, the eNB 20 may use at least one of the following mechanisms. A first option is to instruct a scheduler portion of the eNB 20 to stop providing UL grants to the interfering carriers simultaneously, so that they do not carry transmissions at the same time. This means that the UL communication is still in use on both carriers. As a further option, the eNB 20 may configure or schedule transmissions of report from the UE 10 to the eNB in a suitable manner. For example, a CSI reporting and/or SRS transmissions on the interfering carriers are configured in such a manner so that they are not transmitted simultaneously on the two problematic carriers.

Figure 7:
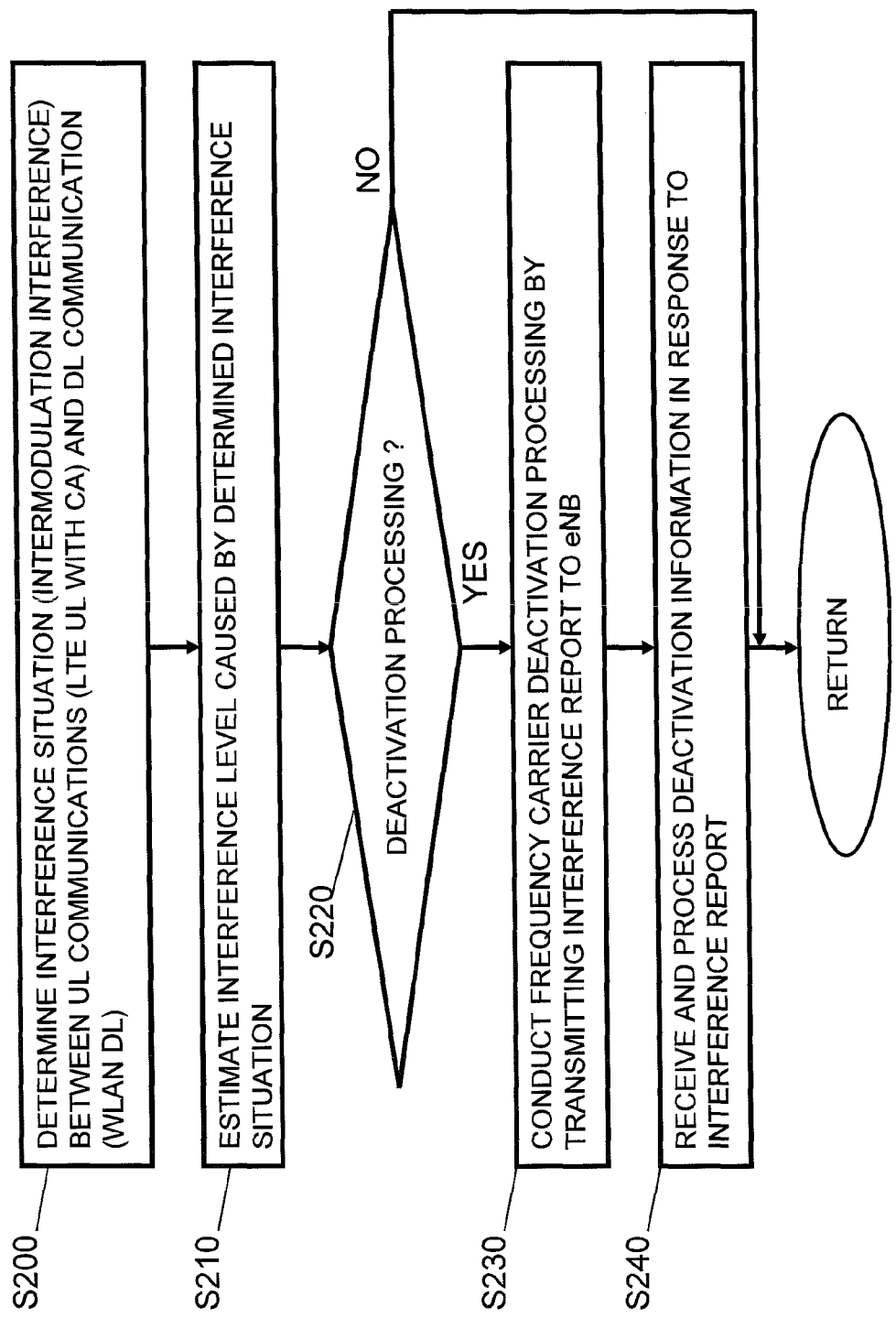
FIG. 7 shows flow chart illustrating a procedure conducted by a communication element according to a further example of an embodiment of the invention.

FIG. 7 shows a flow chart illustrating a procedure conducted by a communication element, such as UE 10 as shown in FIG. 1, according to the present example of an embodiment of the invention.

It is to be noted that steps S200 to S220 are similar to steps S100 to S120 according to the preceding examples of embodiments described in connection with FIG. 5. That is, in step S200, an interference situation (e.g. IMD2 hitting at least partially of top of for instance used ISM channel) caused between a first set of communications performed on at least two different frequency bands (e.g. the UL1 and UL2 communications) and a second communication performed on another frequency band being different to the at least two frequency bands of the first set of communications (e.g. the DL communication on WLAN band) is determined, for example on the basis of a comparison between scheduled or estimated timings for transmissions in the first set of communications (e.g. the UL allocation grants) and scheduled or estimated timings for a transmission in the second communication (e.g. expected or known reception time in DL WLAN communication).

In step S210, an interference level estimation is conducted as described in connection with step S110, wherein on the basis of the interference level estimation (threshold comparison) in step S220 a decision is made as to whether the (alternative) deactivation procedure is conducted (YES in S220) or the deactivation procedure is stopped (NO in step S220).

Similar to the procedure according to FIG. 5, it is to be noted that steps S210 and S220 may also be omitted in further examples of embodiments of the invention, i.e. the deactivation is executed as soon as an interference situation is determined (step S230 follows to step S200).

In step S230, the alternative deactivation procedure described above is started. That is, according to the present examples of embodiments of the invention, an interference report is transmitted to the eNB 20 informing about the interference situation and indicating the pair of frequencies related to the carriers of the UL communications causing the interference (IMD2, for example).

In step S240, in response to the signaling in step S230, a message from the eNB 20 is received in which information regarding the deactivation of either of the carriers is provided.

Figure 8:
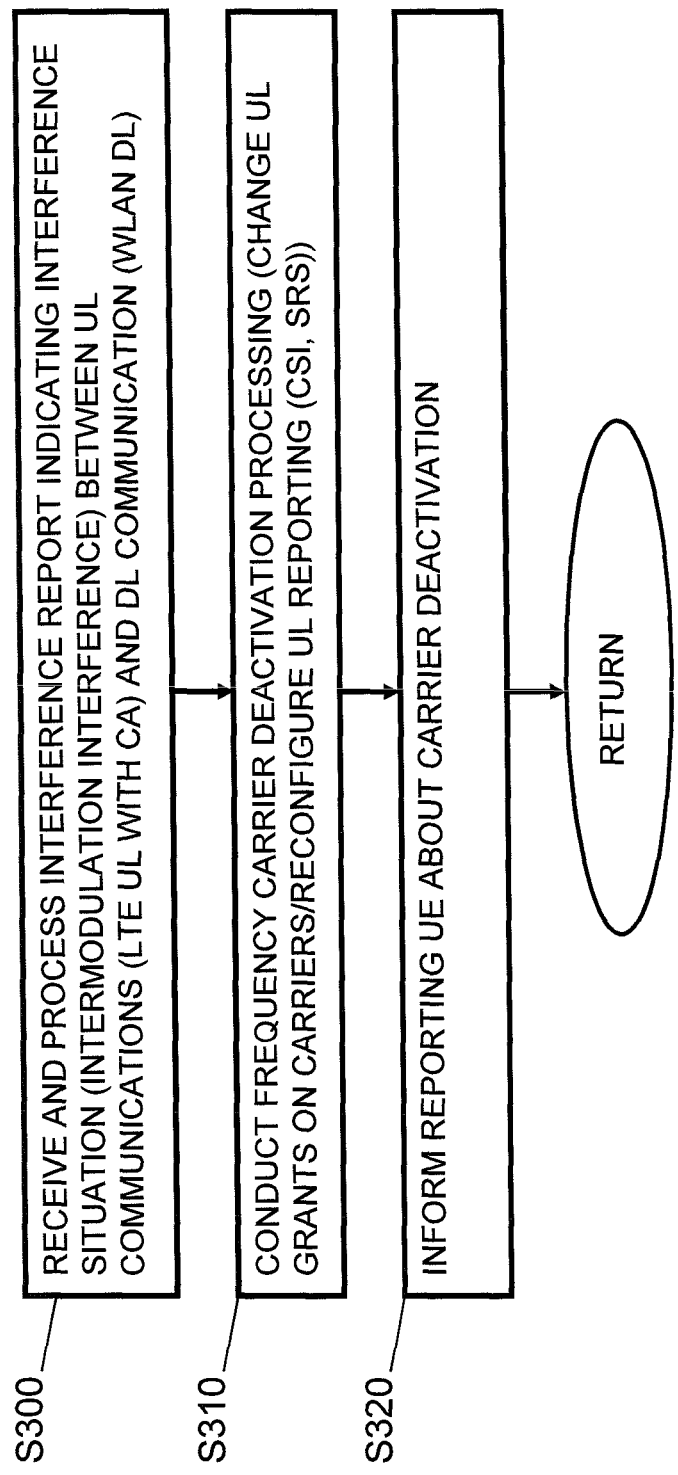
FIG. 8 shows flow chart illustrating a procedure conducted by a communication network control element according to the further example of an embodiment of the invention.

FIG. 8 shows a flow chart illustrating a procedure conducted by a communication network control element, such as eNB 20 as shown in FIG. 1, according to the present example of an embodiment of the invention. The procedure according to FIG. 8 is the counterpart of the UE procedure according to FIG. 7, for example.

In step S300, an interference report is received and processed. The interference report indicates an interference situation (e.g. IMD2) caused between a first set of communications (e.g. UL1 and UL2 communications) performed on at least two different frequency bands and another communication performed on another frequency band (e.g. a WLAN band, but this information is not necessarily provided in the interference report when being not of relevance for the deactivation procedure) being different to the at least two frequency bands of the first set of communications. Furthermore, the interference report comprises frequency information identifying carriers of the at least two different frequency bands of the first set of communications.

In step S310, the eNB 20 conducts a deactivation processing by deactivating transmission on either one of the carriers of the at least two frequency bands of the first set of communications which are indicated in the interference report. For example, a transmission time scheduler is caused to provide only such UL grants on one of the carriers for times being different to times of UL grants for a transmission on the other carrier in order to inhibit simultaneous transmission on each carrier. Furthermore, a communication configuration is set such that a report signaling such as CSI reporting or SRS signaling is not done simultaneously on the carriers.

In step S320, a response to the interference report is transmitted informing the UE 10 about the deactivation of either carrier of the carriers indicated in the interference report.

Figure 9:
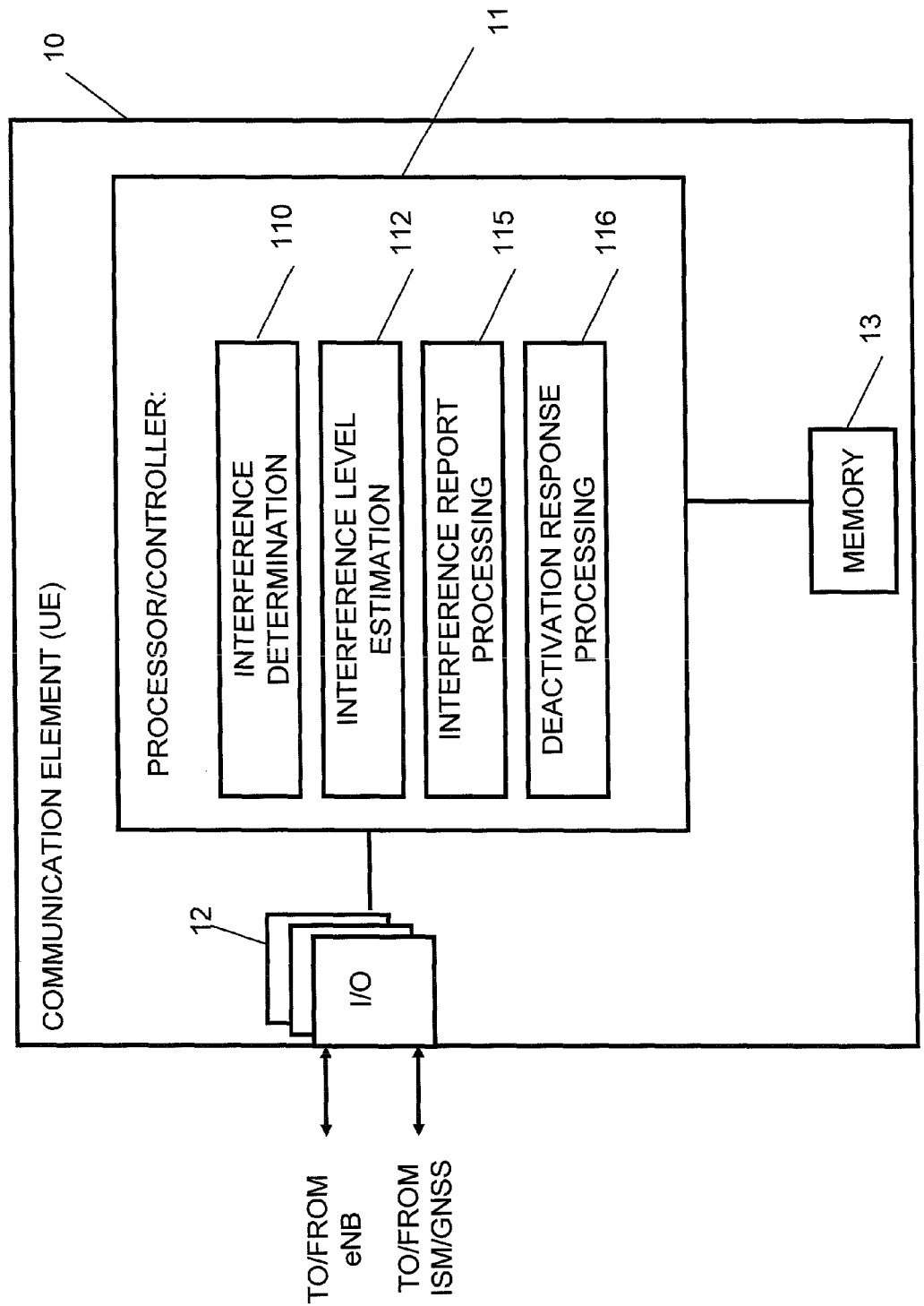
FIG. 9 shows a block circuit diagram of a communication element including processing portions conducting functions according to further examples of embodiments of the invention.

In FIG. 9, a block circuit diagram illustrating a circuitry indicating a configuration of a communication element, such as UE 10, is shown, which is configured to implement the alternative processing for controlling communications as described in connection with the present examples of embodiments of the invention. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element or UE 10 shown in FIG. 9 may comprise several further elements or functions besides those described herein below, which are omitted herein for the sake of simplicity as they are not essential for understanding the invention. Furthermore, even though reference is made to an UE, the communication element may be also another device having a similar function, such as a modem chipset, a chip, a module etc., which can also be part of a device such as a UE or attached as a separate element to a UE, or the like.

It is to be noted that parts of the configuration of the communication element according to FIG. 9 are similar to respective parts of the configuration of the communication element according to FIG. 6 so that the same reference signs are used.

The communication element or UE 10 may comprise a processing function or processor 11, such as a CPU or the like, which executes instructions given by programs or the like related to the control signal transmission control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O units 12 may be used for communicating with a communication network control element like eNB 20 and a communication network or system like ISM server 30 or GNSS system 35. The I/O unit 12 may be a combined unit comprising communication equipment towards several network elements, or may comprise a distributed structure with a plurality of different interfaces for different network elements (see e.g. FIG. 2). Reference sign 13 denotes a memory usable, for example, for storing data and programs to be executed by the processor 11 and/or as a working storage of the processor 11.

The processor 11 is configured to execute processing related to the above described mechanism for controlling communications. In particular, the processor 11 comprises a sub-portion 111 as a processing portion which is usable for determining an interference situation. The portion 111 may be configured to perform processing according to step S200 according to FIG. 7, for example. Furthermore, the processor 11 comprises a sub-portion 112 usable as a portion for estimating an interference level. The portion 112 may be configured to perform processing according to steps S210 and S220 according to FIG. 7, for example. In addition, the processor 11 comprises a sub-portion 115 as a processing portion which is usable for processing or generating an interference report. The portion 115 may be configured to perform processing according to step S230 according to FIG. 7, for example. Furthermore, the processor 11 comprises a sub-portion 116 as a processing portion which is usable for receiving and processing a deactivation response. The portion 116 may be configured to perform processing according to step S240 according to FIG. 7, for example.

Figure 10:
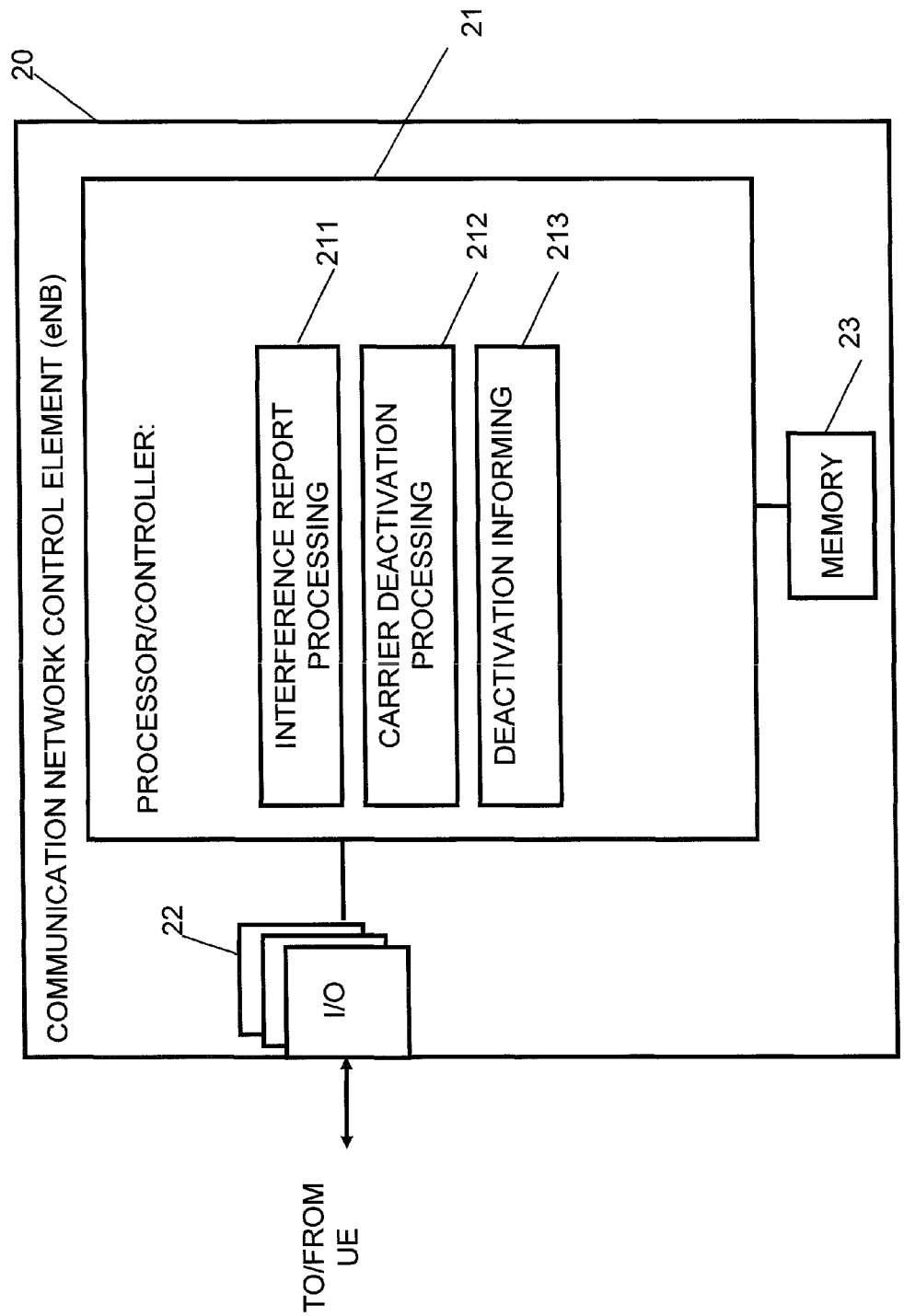
FIG. 10 shows a block circuit diagram of a communication network control element including processing portions conducting functions according to further examples of embodiments of the invention.

In FIG. 10, a block circuit diagram illustrating a circuitry indicating a configuration of a communication network control element, such as of the eNB 20 shown in FIG. 1, is shown, which is configured to implement the processing for controlling communications as described in connection with the present examples of embodiments of the invention. That is, a circuitry is shown which comprises at least one processor and at least one memory including computer program code the at least one memory and the computer program code being configured to, with the at least one processor, cause the eNB 20 to perform functions described below, for example by executing a corresponding algorithm. It is to be noted that the communication network control element or eNB 20 shown in FIG. 10 may comprise several further elements or functions besides those described herein below, which are omitted herein for the sake of simplicity as they are not essential for understanding the invention. Furthermore, even though reference is made to an eNB, the communication network control element may be also another device having a similar function, such as a modem chipset, a chip, a module etc., which can also be part of a base station or eNB or attached as a separate element to a base station or eNB, or the like.

The communication network control element or eNB 20 may comprise a processing function or processor 21, such as a CPU or the like, which executes instructions given by programs or the like related to the control signal transmission control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units connected to the processor 21. The I/O units 22 may be used for communicating with one or more communication elements, such as UE 10. The I/O units 22 may be a combined unit comprising communication equipment towards several of the network element in question, or may comprise a distributed structure with a plurality of different interfaces for each network element in question. Reference sign 23 denotes a memory usable, for example, for storing data and programs to be executed by the processor 21 and/or as a working storage of the processor 21.

The processor 21 is configured to execute processing related to the above described mechanism for controlling communications, for example. In particular, the processor 21 comprises a sub-portion 211 as a processing portion which is usable for processing an interference report. The portion 211 may be configured to perform processing according to step S300 according to FIG. 8, for example. Furthermore, the processor 21 comprises a sub-portion 212 as a processing portion which is usable as a portion for conducting a communication or carrier deactivation processing. The portion 212 may be configured to perform a processing according to step S310 according to FIG. 8, for example. Moreover, the processor 21 comprises a sub-portion 213 as a processing portion which is usable as a portion for informing the UE about the deactivation. The portion 213 may be configured to perform processing according to step S320 according to FIG. 8, for example.

Next, application examples of different mechanisms for controlling communications according to examples of embodiments of the invention and according to a comparative example are described with regard to FIGS. 11 to 14.

Specifically, FIGS. 11 to 14 illustrate different scenarios of communications where UL communications in LTE-A using inter-band CA co-exists with DL communication on an ISM band. In all of these examples it is assumed that intermodulation distortion caused by the UL communications would hit on top of the ISM channel/band, for instance WLAN, as described in connection with FIG. 4. In the diagrams according to FIGS. 11 to 14, the ordinate indicates different frequency ranges, i.e. $F_{DL\_ISM}$ for the DL communication on the ISM band, $F_{UL1}$ and $F_{UL2}$ for the UL communications in the LTE-A frequency range, while the abscissa indicates the time. That is, the communications conducted on the respective UL and DL bands as well as the distortions (IMD2, H3) are shown in a time based manner.

Figure 11:
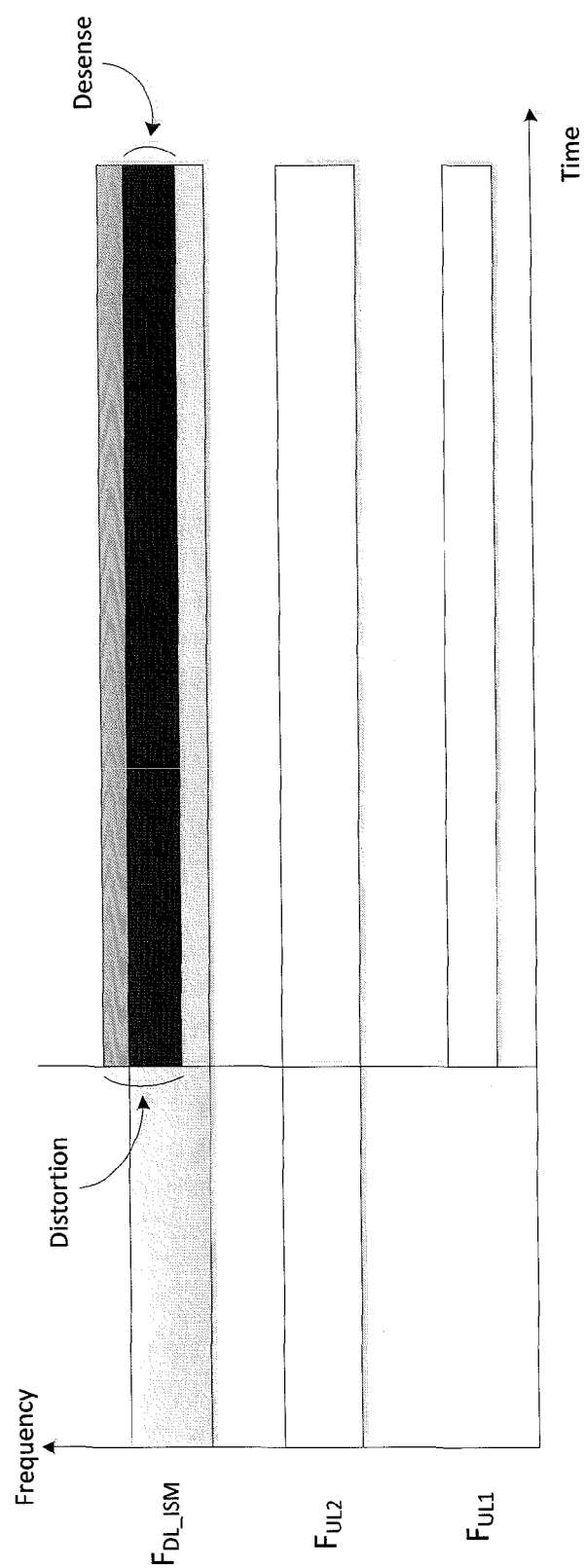
FIG. 11 shows a diagram illustrating a scenario of interference in an IDC communication example.

In FIG. 11, a comparative example is shown where it is assumed that none of the deactivation procedures described above is conducted. That is, as shown in FIG. 11, both UL communications and the DL communication are active simultaneously, causing corresponding distortion and desense at the DL communication. In other words, in the comparative example, the ISM DL communication suffers from desense.

Figure 12:
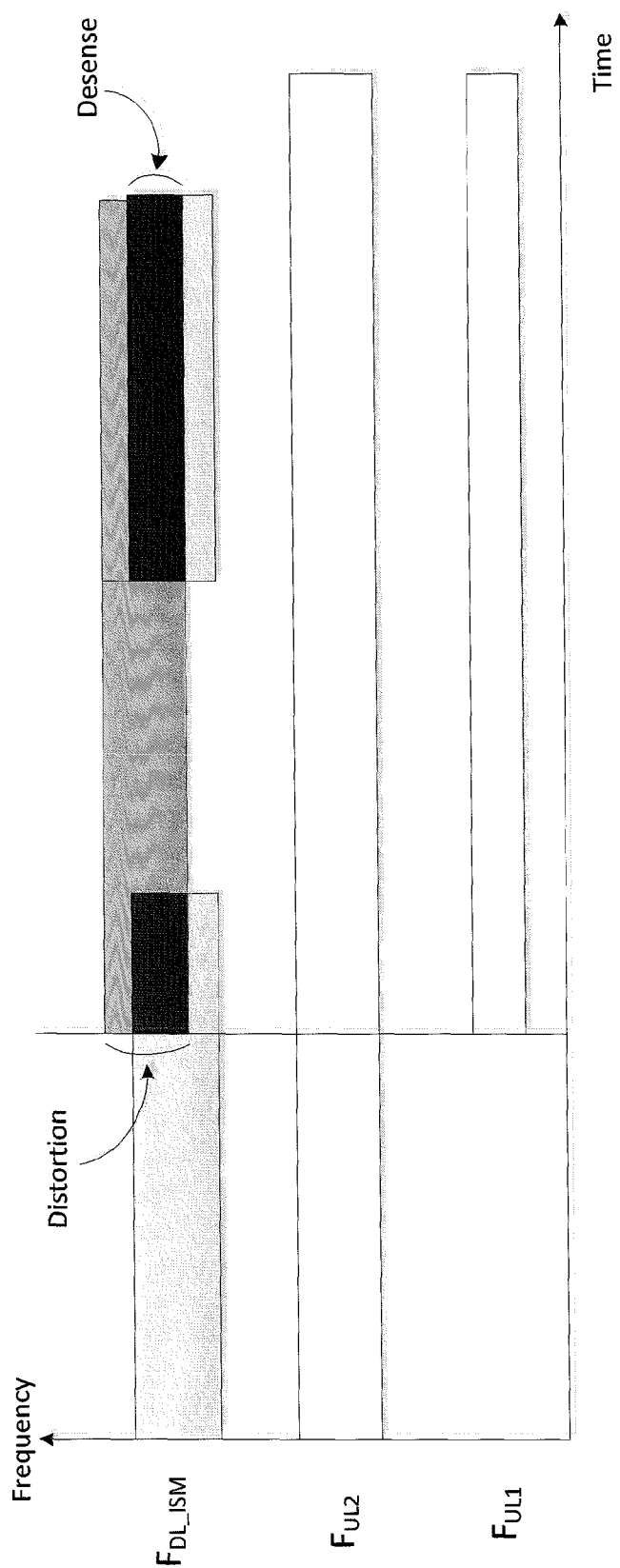
FIG. 12 shows a diagram illustrating a scenario of interference in an IDC communication example according to an example of embodiments of the invention.

In FIG. 12, a further comparative example is shown where a deactivation procedure according to examples of embodiments of the invention is conducted. Here, when the ISM DL communication is not active all the time, during these times, there is still intermodulation distortion on ISM DL frequency, but there is no desense since there is no ISM signal to be received.

Figure 13:
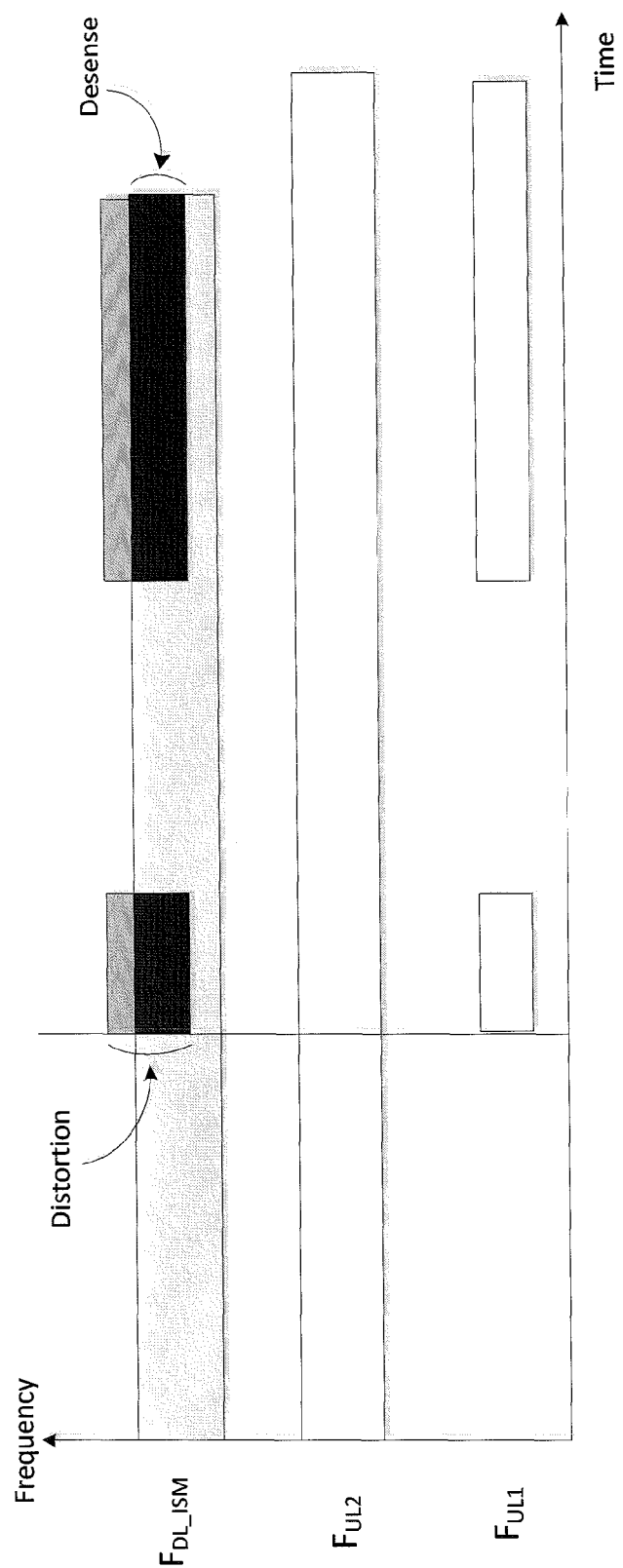
FIG. 13 shows a diagram illustrating a scenario of interference in an IDC communication example according to an example of embodiments of the invention.

In FIG. 13, a case is shown where examples of embodiments of the invention are implemented. Specifically, as shown in FIG. 13, there are times where the UL communication on UL1 is deactivated (e.g. UL1 is denied or TX grant is not allocated). During that time there is neither distortion nor desense on ISM DL communication, even if ISM DL communication and UL2 communication are active.

Figure 14:
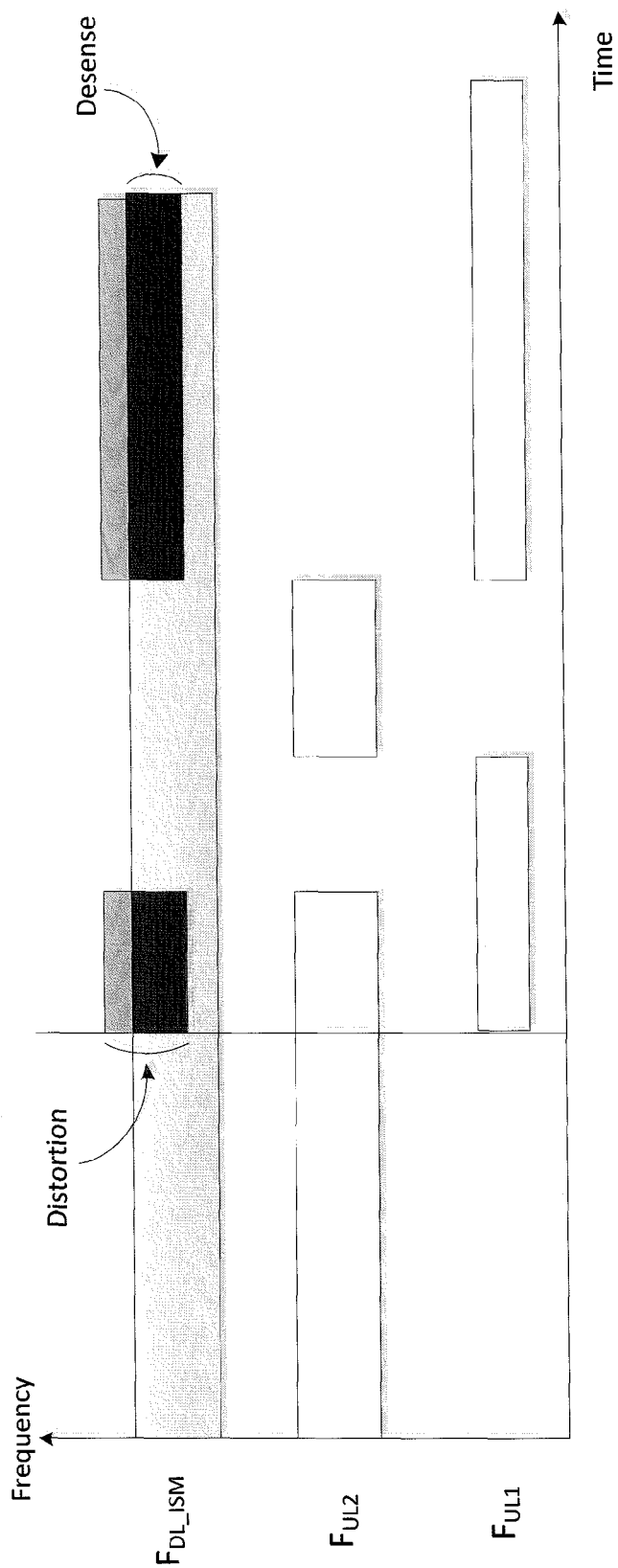
FIG. 14 shows a diagram illustrating a scenario of interference in an IDC communication example according to an example of embodiments of the invention.

In FIG. 14, a case is shown where examples of embodiments of the invention are implemented. Specifically, as shown in FIG. 14, there are times where the UL communication on UL1 is deactivated (e.g. UL1 is denied or TX grant is not allocated), and times where the UL communication on UL2 is deactivated (e.g. UL2 is denied or TX grant is not allocated). In other words, the denied/not allocated UL communication changes in such a way that the UL communications are not active concurrently. As a result, in times where either of the UL communications is deactivated, there is neither distortion or desense on ISM DL, even if the ISM DL communication and the other UL communication are active.

It is to be noted that in examples of embodiments of the invention autonomous denial is used as an IDC mechanisms for deactivating UL communication. However, it is also possible to apply another mechanism for deactivating either one of the carriers of the UL communications causing the interference situation, such as IMD2 hitting at least partially of top of for instance used ISM channel. An example of such alternative mechanism for deactivating is selective suppression of channel status indication transmissions.

Furthermore, as described above, examples of embodiments of the invention are described to be implemented in UEs and eNBs. However, the invention is not limited to this. For example, examples of embodiments of the invention may be implemented in a wireless modem or the like.

In addition, it is to be noted that a communication element or UE may be configured to comprise elements and/or to conduct functions corresponding to all of the above described examples of embodiments of the invention being related to a communication element, i.e. may be configured to conduct an autonomous denial and an interference reporting processing. In other words, all processing portions according to FIGS. 6 and 9 may be combined in one communication element, for example.

According to further examples of embodiments of the invention, there is provided an apparatus comprising interference determination means for determining an interference situation caused between a first set of communications performed on at least two different frequency bands and a second communication performed on another frequency band being different to the at least two frequency bands of the first set of communications, and frequency carrier deactivation processing means for conducting a deactivation procedure to deactivate either one of carriers of the at least two frequency bands of the first set of communications in case the interference situation is determined.

According to further examples of embodiments of the invention, there is provided an apparatus comprising interference situation report processing means for receiving and processing an interference report indicating an interference situation caused between a first set of communications performed on at least two different frequency bands and another communication performed on another frequency band being different to the at least two frequency bands of the first set of communications, wherein the interference report comprises frequency information identifying carriers of the at least two different frequency bands of the first set of communications, and carrier transmission deactivation means for deactivating transmission on either one of carriers of the at least two frequency bands of the first set of communications on the basis of the frequency information comprised in the interference report.

According to still further examples of embodiments of the invention, there is provided, according to an aspect A, a method comprising determining an interference situation caused between a first set of communications performed on at least two different frequency bands and a second communication performed on another frequency band being different to the at least two frequency bands of the first set of communications, and conducting a deactivation procedure to deactivate either one of carriers of the at least two frequency bands of the first set of communications in case the interference situation is determined.

According to an aspect A1, in the method according to aspect A, the interference situation is determined on the basis of a comparison between scheduled or estimated timings for transmissions in the first set of communications and scheduled or estimated timings for a transmission in the second communication.

According to an aspect A2, in the method according to aspect A or A1, the first set of communications comprises at least two uplink communications using carrier aggregation, and the second communication is a downlink communication, wherein the interference situation comprises an interference through intermodulation.

According to an aspect A3, in the method according to any of aspects A to A2 the first set of communications is conducted on frequency bands used for a cellular wireless communication system, and the second communication is conducted on a frequency band used for at least one industrial, scientific and medical communication, and a global navigation satellite system communication.

According to an aspect A4, the method according to any of aspects A to A3 15 further comprises estimating a level of interference caused by the determined interference situation, comparing the estimated level of interference with a predetermined threshold, and deciding to conduct the deactivation procedure in case the estimated level of interference is equal to or higher than the predetermined threshold, or to stop the deactivation procedure in case the estimated level of interference is lower than the predetermined threshold.

According to an aspect A5, the method according to aspect A4 further comprises estimating the level of interference by comparing a transmission output power level for communications of the first set of communications with a preset power threshold.

According to an aspect A6, in the method according to any of aspects A to A5, the method is implemented in a communication element, such as a user equipment, including plural transceivers capable of conducting in-device co-existence operation by communicating on different frequency bands.

According to an aspect A7, the method according to any of aspects A to A6 further comprises conducting as the deactivation procedure to deactivate either one of carriers of the at least two frequency bands of the first set of communications an autonomous denial operation comprising a selection process for selecting either one of the carriers of the at least two frequency bands, and a denial process for inhibiting a transmission on the selected carrier for a predetermined time based on the determined interference situation.

According to an aspect A8, in the method according to aspect A7, the selection process is based on at least one of a determination which communication of the first set of communications performed on the at least two different frequency bands does not comprise a control channel, a determination which communication of the first set of communications performed on the at least two different frequency bands has less resource blocks, and which communication of the first set of communications performed on the at least two different frequency bands causes more interference.

According to an aspect A9, the method according to any of aspects A to A6 further comprises causing sending of an interference report indicating the interference situation and comprising frequency information identifying carriers of the at least two different frequency bands of the first set of communications.

According to an aspect A10, the method according to aspect A9 further comprises receiving and processing an information indicating a deactivation of either carrier of the carriers indicated in the interference report.

According to still further examples of embodiments of the invention, there is provided, according to an aspect B, a method comprising receiving and processing an interference report indicating an interference situation caused between a first set of communications performed on at least two different frequency bands and another communication performed on another frequency band being different to the at least two frequency bands of the first set of communications, wherein the interference report comprises frequency information identifying carriers of the at least two different frequency bands of the first set of communications, and deactivating transmission on either one of carriers of the at least two frequency bands of the first set of communications on the basis of the frequency information comprised in the interference report.

According to an aspect B1, the method according to aspect B further comprises causing transmitting of a response to the interference report, the response comprising an information indicating a deactivation of either carrier of the carriers indicated in the interference report.

According to an aspect B2, in the method according to aspect B or B1, the first set of communications comprises at least two uplink communications using carrier aggregation, wherein the interference situation comprises an interference through intermodulation.

According to an aspect B3, in the method according to any of aspects B1 to B2, the first set of communications is conducted on frequency bands used for a cellular wireless communication system, and the other communication is conducted on a frequency band used for at least one industrial, scientific and medical communication, and a global navigation satellite system communication.

According to an aspect B4, the method according to any of aspects B to B3 further comprises causing a transmission time scheduler to provide grants for transmission on one of the carriers of the at least two frequency bands of the first set of communications for a time being different to a time of grants for transmission on another one of the carriers of the at least two frequency bands of the first set of communications in order to inhibit simultaneous transmission on each of the carriers.

According to an aspect B5, the method according to any of aspects B to B4 further comprises causing a communication configuration portion arranged to configure a signaling on the first set of communications to set a configuration in which at least one of a channel state reporting and a reference signal transmission is scheduled for each of the first set of communications so as to inhibit a simultaneous transmission via the at least two frequency bands.

According to an aspect B6, in the method according to any of aspects B to B5, the method is implemented in a communication network control element, such as an enhanced Node B, wherein the interference report is received from a user equipment controlled by the communication network control element, the user equipment including plural transceivers capable of conducting in-device co-existence operation by communicating on different frequency bands.

According to still further examples of embodiments of the invention, there is provided, according to an aspect C, a computer program product for a computer, comprising software code portions for performing the steps of any of aspects A to A10 or B to B6, when said product is run on the computer.

According to an aspect C1, the computer program product according to aspect C further comprises a computer-readable medium on which said software code portions are stored.

According to an aspect C2, in the computer program product according to aspect C1, the computer program product is directly loadable into the internal memory of the computer and/or transmittable via a network by means of at least one of upload, download and push procedures.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modem chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Furthermore, as used in this application, the terms 'device' or 'circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor (s)/software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device As described above, there is provided a mechanism for controlling communications conducted in multiple frequency bands so as to decrease an interference level between the communications. When an interference situation caused between a first set UL communications performed on at least two different frequency bands and a DL communication performed on another frequency band is determined, a frequency carrier deactivation processing is conducted so as to deactivate either one of carriers of the at least two frequency bands of the set of UL communications. The deactivation processing comprises for example an autonomous denial on the UE side or an interference reporting with deactivation on the eNB side.

Although the present invention has been described herein before with reference to particular embodiments thereof, the present invention is not limited thereto and various modifications can be made thereto.

The invention claimed is:

1. An apparatus comprising or disposed within a user equipment, the apparatus comprising:
at least one processor; and
at least one memory including computer program code;

the at least one memory and the computer program code configured, with the at least one processor, to cause the user equipment to perform at least:
- an interference determination function configured to determine an interference situation caused between a first set of uplink communications performed on at least two different frequency bands and a second communication performed on another frequency band being different to the at least two frequency bands of the first set of uplink communications, and
- a frequency carrier deactivation processing function by which the user equipment conducts an autonomous denial process that operates to deactivate at least one but less than all frequency carriers of the at least two frequency bands of the first set of uplink communications in case the interference situation is determined.

2. The apparatus according to claim 1, wherein the interference determination function is configured to determine the interference situation on the basis of a comparison between scheduled or estimated timings for transmissions in the first set of uplink communications and scheduled or estimated timings for a transmission in the second communication.

3. The apparatus according to claim 1, wherein:
- the first set of uplink communications comprises at least two uplink communications to a cellular communication network using carrier aggregation and the at least one frequency carrier is a component carrier of the carrier aggregation, and
- the second communication is a downlink communication using a non-cellular radio access technology,
wherein the interference situation comprises an interference through intermodulation.

4. The apparatus according to claim 1, wherein:
- the first set of uplink communications is conducted on frequency bands used for a cellular wireless communication system, and
- the second communication is conducted on a frequency band used for at least one of an industrial, scientific and medical (ISM) communication, and a global navigation satellite system (GNSS) communication.

5. The apparatus according to claim 1, wherein the at least one memory and the computer program code are configured to, with the at least one processor, cause the user equipment to further perform at least:
- an interference level estimation function configured to estimate a level of interference caused by the determined interference situation, to compare the estimated level of interference with a predetermined threshold, and to decide to cause the frequency carrier deactivation processing function to conduct the autonomous denial process in case the estimated level of interference is higher than the predetermined threshold, or to cause the frequency carrier deactivation processing function to stop the autonomous denial process in case the estimated level of interference is lower than the predetermined threshold.

6. The apparatus according to claim 5, wherein the interference level estimation function is further configured to estimate the level of interference by comparing a transmission output power level for communications of the first set of uplink communications with a preset power threshold.

7. The apparatus according to claim 1, wherein the user equipment includes plural transceivers capable of conducting in-device co-existence operation by communicating on different frequency bands.

8. The apparatus according to claim 1, wherein the user equipment autonomously deactivates the at least one frequency carrier according to an autonomous denial operation which comprises:
- a selection process for selecting the at least one frequency carrier of the at least two frequency bands, and
- a denial process for inhibiting a transmission on the selected at least one frequency carrier for a predetermined time based on the determined interference situation.

9. The apparatus according to claim 8, wherein the selection process selects the at least one frequency carrier on the basis of at least one of:
- a determination which communication of the first set of uplink communications performed on the at least two different frequency bands does not comprise a control channel,
- a determination which communication of the first set of uplink communications performed on the at least two different frequency bands has less resource blocks, and
- which communication of the first set of uplink communications performed on the at least two different frequency bands causes more interference.

10. The apparatus according to claim 1, wherein the at least one memory and the computer program code are configured to, with the at least one processor, cause the user equipment to further perform at least:
- an interference situation reporting function configured to cause the user equipment to send an interference report indicating the interference situation and comprising frequency information identifying the deactivated at least one frequency carrier.

11. A method for operating a user equipment, the method comprising:
- determining an interference situation caused between a first set of uplink communications performed on at least two different frequency bands and a second communication performed on another frequency band being different to the at least two frequency bands of the first set of uplink communications, and
- conducting an autonomous denial process that operates to deactivate at least one but less than all frequency carriers of the at least two frequency bands of the first set of uplink communications in case the interference situation is determined.

12. The method according to claim 11, wherein the interference situation is determined by comparing scheduled or estimated timings for transmissions in the first set of uplink communications against scheduled or estimated timings for a transmission in the second communication.

13. The method according to claim 11, wherein:
- the first set of uplink communications comprises at least two uplink communications to a cellular communication network using carrier aggregation and the at least one frequency carrier is a component carrier of the carrier aggregation, and
- the second communication is a downlink communication using a non-cellular radio access technology,
wherein the interference situation comprises an interference through intermodulation.

14. The method according to claim 11, wherein:
- the first set of uplink communications is conducted on frequency bands used for a cellular wireless communication system, and
- the second communication is conducted on a frequency band used for at least one of an industrial, scientific and medical (ISM) communication, and a global navigation satellite system (GNSS) communication.

15. The method according to claim 11, the method further comprising:
estimating a level of interference caused by the determined interference situation,
comparing the estimated level of interference with a predetermined threshold, and
deciding to conduct the autonomous denial process in case the estimated level of interference is higher than the predetermined threshold, or deciding to stop the autonomous denial process in case the estimated level of interference is lower than the predetermined threshold.

16. The method according to claim 15, wherein estimating the level of interference further estimates the level of interference by comparing a transmission output power level for communications of the first set of uplink communications with a preset power threshold.

17. The method according to claim 11, wherein the user equipment includes plural transceivers capable of conducting in-device co-existence operation by communicating on different frequency bands.

18. The method according to claim 11, wherein the user equipment autonomously deactivates the at least one frequency carrier according to an autonomous denial operation which comprises:
selecting the at least one frequency carrier of the at least two frequency bands, and
inhibiting a transmission on the selected at least one frequency carrier for a predetermined time based on the determined interference situation.

19. The method according to claim 18, wherein the at least one frequency carrier is selected on the basis of at least one of:
which communication of the first set of uplink communications performed on the at least two different frequency bands does not comprise a control channel,
which communication of the first set of uplink communications performed on the at least two different frequency bands has less resource blocks, and
which communication of the first set of uplink communications performed on the at least two different frequency bands causes more interference.

20. A memory storing computer program code which, when executed by at least one processor of a user equipment, causes the user equipment to:
determine an interference situation caused between a first set of uplink communications performed on at least two different frequency bands and a second communication performed on another frequency band being different to the at least two frequency bands of the first set of communications, and
conduct an autonomous denial process that operates to deactivate at least one but less than all frequency carriers of the at least two frequency bands of the first set of communications in case the interference situation is determined.

* * * * *